United States Patent [19]  [11] 4,070,523
Blum et al.  [45] Jan. 24, 1978

[54] PRINTABLE PRESSURE-SENSITIVE ADHESIVE TAPES

[75] Inventors: Alfred Blum, Skokie; Charles Bartell, Highland Park, both of Ill.

[73] Assignee: Borden, Inc., Columbus, Ohio

[21] Appl. No.: 670,189

[22] Filed: Mar. 25, 1976

[51] Int. Cl.$^2$ .............................. C09J 7/02; C09J 7/04
[52] U.S. Cl. ................................. 428/352; 260/32.8 R; 260/32.8 N; 428/343; 428/354; 428/524
[58] Field of Search ................ 428/352, 343, 354, 40, 428/524, 526; 260/32.8 R, 63 CQ, 32.8 N

[56] References Cited

U.S. PATENT DOCUMENTS

| | | | |
|---|---|---|---|
| 2,532,011 | 11/1950 | Dahlquist et al. | 260/859 |
| 3,475,196 | 10/1969 | Bartell et al. | 428/352 |
| 3,543,920 | 12/1970 | Crocker et al. | 428/195 |

OTHER PUBLICATIONS

Encyclopedia of Polymer Science and Technology, 1969, pp. 273-279.

*Primary Examiner*—Marion E. McCamish
*Assistant Examiner*—P. J. Thibodeau
*Attorney, Agent, or Firm*—Daniel D. Mast; George P. Maskas; George A. Kap

[57] ABSTRACT

Polyketone resins are used as an ingredient of the release coating for a flexible pressure-sensitive tape. The release coatings are printable and at the same time remain effective as release agents due to the presence of the polyketone resins. The polyketone resins are blended with a monomeric or polymeric release agent and an elastomeric or resinous film former to give the improved properties.

5 Claims, No Drawings

PRINTABLE PRESSURE-SENSITIVE ADHESIVE TAPES

BACKGROUND OF THE INVENTION

This invention relates to a novel class of solvent release coats for pressure-sensitive tapes, and, more specifically, to poly ketone resin — release agent blends. In addition to their excellent release properties, these coatings were found to exhibit outstanding adhesion to impervious plastic film substrates as well as to commercially available flexographic inks. Briefly, we have discovered a multifunctional coating which offers to the pressure-sensitive tape industry an unusual combination of desirable properties, versatility, and marketing potential at relatively low cost.

Patents have described a variety of pressure-sensitive tapes comprising in essence a normally tacky and pressure-sensitive, elastomeric adhesive, a flexible backing or substrate and a release coat which facilitates the unwinding of tapes made in roll form. For the most common pressure-sensitive tapes with various substrates, satisfactory unwind properties are generally achieved with a release coating comprising stearates, metallic Werner complex compounds, or polymers with a carbon chain back-bone having attached thereto an adequate number of fatty acid radicals represented by alkyl groups with from 10 – 22 carbon atoms. Of equal importance for practical purposes is the presence of polar groups (hydroxy, carboxy, amino, etc.) in the polymeric back-bone or structure of the commercial release agents. We theorize that their primary function is to insure proper adhesion to various tape backings and thus prevent partial stripping or even total transfer to the adjacent adhesive layer. Although very efficient at relatively low coating weights, the above standard release agents such as, for example, "Quilon", the Werner complex compound supplied by du Pont or the release polymers described in U.S. Pat. Nos. 2,532,011; 2,816,655; 3,475,196, exhibited very poor ink receptivity thus precluding any attempts to print the respective tape backings altogether. Another deficiency of standard release agents is their limited ability to adhere strongly to non-polar substrates such as the great variety of plastic films utilized throughout the industry. When printability is a desired feature, this limitation is even more critical since strong anchorage to the plastic film substrates is a crucial requirement.

Numerous attempts have been made in the past to overcome the above-mentioned limitations of prior release agents. Thus, a logical approach would involve the synthesis of a polymeric back-bone comprising an increased number of polar groups capable of providing additional anchoring sites. However, due to the delicate balance of hydrophobic and hydrophilic groups, this would lead to decreased release efficiency which is not desirable. Another approach involving surface roughening and subsequent application of a pigmented backsize coating was found too cumbersome and produced an objectionable haziness, thus precluding the production of transparent tapes. In the case of pressure-sensitive cellophane tapes, the printability problem was solved by a different approach; namely, printing of the rather absorptive cellophane film prior to the tape manufacturing process. According to another method, the release agent is blended with vinyl chloride/vinyl acetate copolymers or other film formers to provide a release coating composition capable of filling in the rugosities of the backing or otherwise modify the release material or the properties of the backing.

Subsequent attempts to utilize similar or related formulations, including those described in U.S. Pat. No. 3,543,920 as printable release coats for plastic film substrates, were found marginal in performance for one or several of the following reasons:

1. Poor adhesion to a variety of impervious plastic films.
2. Haziness of dried coatings.
3. Borderline ink anchorage resulting in pickoff by pressure-sensitive adhesives.
4. Detackification tendency of adjacent adhesive at the very low coating weights applied on common film tapes.

SUMMARY OF THE INVENTION

We have discovered that all of above shortcomings pertinent to prior art release agent/film former systems can be eliminated with unexpected good results by utilizing polyketone resins which act as a crucial component. These are hard, clear, amorphous resins made by internal condensation of cyclic ketones. Presumably, the polymerization reaction proceeds in a manner similar to that in which two molecules of acetone condense to form diacetone alcohol. The polymer structure can be represented by a series of cyclohexyl rings, joined at the 2- or 4-positions and with free hydroxyl groups pendant from each ring. This stable saturated structure has a keto grouping as the terminal group.

Those polyketone resins are manufactured by Union Carbide, and are also commercially available from the Krumbhar Division of Lawter Chemicals under the designation of K-1717. The preferred resin of our invention is "K-1717 B" — a low molecular weight grade — found to exhibit a combination of desirable properties such as:

a. Solubility in a variety of solvents comprising ketones, alcohols, esters, chlorinated hydrocarbons, aromatics, etc. as well as maximum tolerance for aliphatic solvents.

b. Wide range of compatibility with various resins and elastomeric film formers.

c. Excellent adhesion to difficult surfaces such as hydrophobic plastic films and aluminium foils.

d. Clarity and oxidative stability — due to stable structure — combined with low viscosity of solutions.

e. Excellent intercoat adhesion which is critical for good ink anchorage.

The present invention offers new solvent release-coat systems based on the following essential components:

1. Monomeric or polymeric release agents including: long chain alkyl urethanes of polyvinylalcohol; fatty acid amides of polyethyleneimine, ethyleneoxide, acrylic acid, etc.; fatty acid esters of polyvinylacetate; copolymers of stearyl acrylate of stearyl methacrylate; derivatives of stearyl phosphates; terpolymers of vinylidene chloride, fumaric acid and acrylates; complexes of fatty acids or acetic esters with Al, Ti and, stearato chromic chloride; perfluorderivatives of polyethyleneimine; low molecular weight grades of polyethylene; and silicones.

2. Elastomeric or resinous film formers including modified rubbers and their derivatives, cellulose derivatives, vinyl and acrylic resins, polyesters, polyurethanes, polyamides, epoxies, phenoxy resins, melamines, and alkyds.

3. Polyketone resins.

4. Solvents including aromatic hydrocarbons, ketones, esters, glycol-ethers, and alcohols.

The novel class of backsize coatings was found to exhibit the following desirable properties:

a. Excellent release performance without deleteriously affecting the properties of a great variety of pressure-sensitive adhesives having different curing systems.

b. Maximum formulation versatility with commercially available materials.

c. Excellent ink receptivity and sharp printability with a great variety of flexographic and offset inks.

d. Perfect clarity of dried coatings which does not interfere with substrate transparency.

e. Good anchorage to a variety of substrates and more specifically to hydrophobic plastic films.

f. Unusual intercoat adhesion without affecting release properties.

g. No ink transfer or adhesive pick-off when shelf and ovenaged rolls of pressure-sensitive tapes are unrolled at various speeds.

h. While basically adhesive, these coatings have the ability to develop stable bonds and adhere strongly to a variety of overcoats should their use become desirable.

i. In contrast to similar prior coatings, higher than usual proportions of release agent can be utilized without affecting either printability or tape properties.

The preferred release agent is octadecyl urea of polyethylene imine (ODUP) the preparation of which is described in U.S. Pat. No. 3,475,196 issued to Bartell et al.

The preferred vinyl resin is a vinyl acetate/vinyl alcohol resin solution manufactured by Union Carbide under the designation Bakelite T-24-9. T-24-9 solution is vinyl/acetate/vinyl alcohol resin (MA-28-18) supplied at 28% solids in a methyl acetate — methanol solvent mixture. The 0.56 intrinsic viscosity resin contains 18% vinyl alcohol.

The preferred polyester resin is Vitel PE-307 (formerly Vitel PE-4029 resin) manufactured by Goodyear which is a linear, saturated polyester polymer that is believed to be a polymeric mixture or copolymer of polypropylene and glycerol terphthalate and polypropylene and glycerol azelate.

The preferred polyketone resin is "K-1717 B" commercially available from Lawter Chemical Company. This resin has a specific gravity of 1.14, a softening point (mercury method) of 97° C., and weighs 9.5 pounds per gallon.

Preferred compositions which are homogeneous and practically of unlimited stability can be described as follows:

|  | Parts by Weight |
|---|---|
| Vinyl acetate/vinyl alcohol resin (T-24-9) | 10 – 30 |
| Polyester resin (Vitel 307) | 20 – 70 |
| Polyketone resin (K-1717 B) | 15 – 40 |
| Octadecyl Urea of Polyethyleneimine (Release Agent ODUP) | 1 – 10 |

The above ranges and components are merely illustrative. Our invention will be further illustrated by the following examples. The proportions are expressed as parts by weight unless specifically stated to the contrary.

EXAMPLE 1

This example illustrates fresh and aged characteristics of the printable release coat described herein:

| Resin Components | |
|---|---|
| Vinyl acetate/vinyl alcohol resin (T-24-9) | 18 |
| Polypropylene and glycerol terphthalate copolymer (Vitel 307) | 60 |
| Polyketone resin (K-1717 B) | 20 |
| Release agent (ODUP) | 2 |
| | 100 |

| Solvent Components | |
|---|---|
| Toluene | 1,357 |
| MEK | 205 |
| Methyl Cellosolve | 338 |
| | 1,900 |

A 5% solution of the above was applied with a No. 4 Mayer Bar on a 1 mil Myler film, air dried, and heated under infrared lights for two minutes at approximately 200° F. After cooling, three strips of a standard cellophane pressure-sensitive tape were placed on the coated surface and pressed by rolling twice in both directions with a 4½ lb. rubber roller. A similar procedure was utilized to apply three strips of the same pressure-sensitive tape to a non-release-coated 1 mil Mylar film. Both overtaped sets were shelf and oven (120° F.) aged for 12 days and the force required to separate the 1 inch wide cellophane tape strips from the Mylar backing (T-peel adhesion) was measured on an Instron machine. In addition, the rolling ball tack (R.B.T.) was measured to check any detackification of pressure-sensitive adhesive. The test data, averaged from several readings, are shown in Table 1.

TABLE 1
| RELEASE PROPERTIES | Release Coated Mylar | Plain Mylar |
|---|---|---|
| T-Peel Adhesion, oz./inch | | |
| 12 day shelf | 10.0 | 54 |
| 12 day 120° F | 12.5 | 58 |
| Rolling Ball Tack, inches | | |
| 12 day shelf | 0.5 | 0.42 |
| 12 day 120° F | 0.6 | 0.42 |
| Appearance of Dried Coating | Clear | |

Above data indicates good tack retention for the applied cellophane tape and a rather high level of release efficiency (T-Peel values of coated Mylar roughly 1/5 of readings for non-coated substrate).

EXAMPLE 2

This example illustrates fresh and aged characteristics of a release coat formulation in which the polyketone resin is excluded:

| Resin Components | |
|---|---|
| Vinyl acetate/vinyl alcohol resin | 28 |
| Polypropylene and glycerol copolymer | 70 |
| Release agent (ODUP) | 2 |
| | 100 |

| Solvent Components | |
|---|---|
| Toluene | 1,441 |
| MEK | 105 |
| Methyl Cellosolve | 354 |
| | 1,900 |

A 5% solution of the above components was made up and subsequently subjected to a comparative evaluation on Mylar following the procedure described in Example 1. The test data, averaged from several readings, are shown in Table II.

TABLE II

RELEASE PROPERTIES

| T-Peel Adhesion, oz./inch | Release Coated Mylar | Plain Mylar |
|---|---|---|
| 12 day shelf | 18 | 54 |
| 12 day 120° F | 26 | 58 |
| Rolling Ball Tack, inches | | |
| 12 day shelf | 1.2 | 0.42 |
| 12 day 120° F | 2.5 | 0.42 |
| Appearance of Dried Coating | Hazy | |

Above data indicates a rather unexpected finding, namely; absence of polyketone resin from the release coat formula shown in Ex. 1 had reduced the release efficiency and also affected negatively the rolling ball tack values. Furthermore, the dried coating was hazy in contrast to the very clear and transparent coating obtained from the formulation shown in Ex. 1 even though dried under identical conditions.

EXAMPLE 3

This example illustrates the "ink receptivity" or adhesion at the ink/release coat interface. A 2 mil Mylar film was coated with the release coat formulation of Ex. 1 and similar 6 × 12 inch Mylar film substrates were coated with prior release agents such as those described in U.S. Pat. Nos. 2,532,011, 3,475,196 and with the release composition shown in Ex. 2.

After air and oven drying (3 min. at 250° F), the above Mylar sheets were overcoated with a black flexograhic ink manufactured by Borden's Levey Ink Division and commercially available under the designation "Heat Resistant Black" No. 734RC 0967. Using a No. 0 Mayer Bar to assess the bonding of the ink to the release coated surfaces, a 1 inch × 6 inches of pressure-sensitive cellophane tape was placed firmly on each of the ink-coated Mylar sheets and one end of the tape subsequently pulled back, first slowly and next rapidly at an angle little less than 180°. Complete ink lifting and transfer to the pressure-sensitive adhesive tape was observed for the samples coated with the prior art release agents whereas the tape strip removed from the sample coated with the release formulation of Ex. 1 showed no ink traces. It should be mentioned that a certain degree of ink pickoff was noticed on the cellophane tape upon rapid removal from the sample coated with the release formulation of Ex. 2.

EXAMPLE 4

The release coat of Ex. 1 was applied from a 5% solution with a No. 4 Mayer Bar on a 1 mil Mylar film backing of a commercial polyester electro-insulating tape. On the opposite side of the same film backing, was a base adhesive coat formulated as follows:

| | Parts by Weight |
|---|---|
| Butadiene-Styrene Rubber | 70 |
| Butadiene-Nitrile Rubber | 30 |
| Coumarone Tackifying Resin | 85 |
| Antioxidant (2,5 ditertiary amyl hydroquinone) | 2 |

The adhesive was applied at a coating weight of 5 lbs./ream from a 20% solution made up in a blend of toluene, MEK, and petrolene and having a viscosity of 8,000 cps. On the above dried base coat a pressure-sensitive adhesive was applied at a coating weight of 18 lb./ream. The adhesive was formulated with the following ingredients:

| | Parts by Weight |
|---|---|
| Pale crepe rubber | 80 |
| Styrene-butadiene copolymer | 20 |
| Polyterpene resin, 125° C, MP | 60 |
| Titanium dioxide | 30 |
| Zinc oxide | 16 |
| Yellow pigment (benzidine type) | 2 |
| Heat reactive phenolic resin | 28 |
| Antioxidant (2,5-ditert-amyl hydroquinone) | 2 |

The above mixture was dissolved in a blend of aromatic and aliphatic solvents to form an adhesive having a solids content of 30% and a Brookfield viscosity of 10 to 12 cps. One-inch-wide roll samples of the finished tape were tested for adhesion to steel, 90° tack, and unwind force at various speeds after storage under the conditions described below. The results are shown in the following Table III.

TABLE III

| Panel Adhesion, oz./inch | | |
|---|---|---|
| 12 days shelf | 50 | |
| 12 days 120° | 52 | |
| 90° Tack, oz./inch | | |
| 12 days shelf | 20 | |
| 12 days 120°F | 20 | |
| Unwind Force, oz./inch | 12 Days, Shelf | 12 Days, 120° F |
| 1 ft./min. | 12 | 33 |
| 16 ft./min. | 8 | 28 |
| 60 ft./min. | 5.5 | 22 |
| 160 ft./min. | 4 | 20 |

To check the ink receptivity of this tape, the test described in Example 3 was modified in the sense that one-inch wide strips of the above tape were pressed firmly and close enough to each other on a 12 inch × 6 inch Mylar backing to form an almost continuous surface, with the pressure-sensitive adhesive being in contact with the Mylar backing. Subsequently, the ink of Example 3 was applied with a No. 0 Mayer Bar to the release coated side. After ink drying, the coated tape backings were overtaped with 1 inch wide strips of the roll prepared in this Example 4 utilizing a standard 4½ lb. rubber roller. Those laminates were shelf and over aged for twelve days. After this period the tape pairs were separated by pulling backwards one end of the upper overtaped strip, first slowly and then rapidly at an angle little less than 180°. No ink transfer or adhesive pick-off was observed in spite of this relatively aggressive pressure-sensitive adhesive.

EXAMPLE 5

The release coat of Ex. 1 was reformulated as follows:

| Resin Components | |
|---|---|
| Vinyl acetate/vinyl alcohol resin | 10 |
| Polypropylene and glycerol terphthalate copolymer | 68 |
| Polyketone resin | 18 |
| Release Agent ODPC* | 4 |

| | |
|---|---|
| Solvent Components | |
| Toluene | 1,445 |
| MEK | 205 |
| Isopropyl Alcohol | 250 |
| | 100 |

*ODPC - octadecyl polyvinyl carbamate - U.S. 2,532,011

A 4% solution was applied with a No. 4 Mayer bar on a 1 mil filament reinforced polyester backing of a commercial strapping tape. On the opposite side of the same backing, a base adhesive coat similar in composition to the one described in Ex. 4 was applied at a coating weight of 6 lb./ream. On the above dried base coat a pressure-sensitive adhesive was applied to achieve a coating weight of 45 lbs./ream. The adhesive was formulated with the following ingredients:

| | Parts by Weight |
|---|---|
| Natural rubber (Mooney 55) | 100 |
| Zinc Oxide | 15 |
| Polyterpene Tackifying Resin (MP 115° C) | 80 |
| Antioxidant (2,5 ditertiary amyl hydroquinone) | 2 |
| Accelerators: | |
| Dipentamethylene thiurametrasulfide | 0.5 |
| Zinc dimethyldithiocarbamate | 2 | and dissolved in a blend of aromatic and aliphatic solvents. This adhesive had a solids content of 25% and an average viscosity of 20,000 cps. One-inch wide roll samples of the finished tape were tested for adhesion to steel, 90° tack, and unwind force at various speeds after being shelf and oven (120° F) aged for 12 days. These test data are summarized in the following Table IV.

TABLE IV

| Panel Adhesion, oz./inch | | |
|---|---|---|
| 12 day shelf | | 37 |
| 12 day 120° F | | 47 |
| 90° Tack, oz./inch | | |
| 12 day shelf | | 26 |
| 12 day 120° F | | 21 |
| Unwind Force, oz./inch | 12 Day Shelf | 12 Day 120° F |
| 1 ft./min. | 25 | 30 |
| 16 ft./min. | 37 | 36 |
| 60 ft./min. | 36 | 34 |
| 160 ft./min. | 35 | 34 |

Rolls of this tape were printed on a standard "Markem" press utilizing two different inks, namely: (1) Markem No. 8829 and (2) M-145 Black H.S. Offset Ink (J. H. Mathews & Co.). The appearance of the printed tape was excellent prior to and after rewinding of respective rolls, thus confirming outstanding ink receptivity of the release coat system.

EXAMPLE 6

The release coat of Ex. 1 was modified as follows:

| Resin Components | |
|---|---|
| Vinyl acetate/vinyl alcohol resin | 18 |
| Polypropylene and glycerol terphthalate copolymer | 57 |
| Polyketone resin | 20 |
| Release Agent (ODUP) | 1 |
| Release Agent (ODPC) | 4 |
| | 100 |
| Solvent Components | |
| Toluene | 1,445 |
| MEK | 205 |
| Ethyl Acetate | 100 |
| Isopropyl Alcohol | 150 |
| | 1,900 |

A 5% solution of the above ingredients was subsequently applied with a No. 4 Mayer Bar on a 1 mil polyester backing of a clear commercial packaging tape. On the opposite side of the same backing, the base adhesive coat described in Ex. 4 was applied at a coating weight of 5 lbs./ream. On the dried base coat, pressure-sensitive adhesive was applied at coating weight of 16 lbs./ream. The adhesive was formulated with the following ingredients:

| | Parts by Weight |
|---|---|
| Natural rubber (Mooney 73) | 100 |
| Polyterpene Tackifying Resin (MP 115) | 75 |
| Antioxidant (2,5 ditertiary amyl hydroquinone) | 1 | and dissolved in an aliphatic hydrocarbon solvent. This adhesive had a solids content of 20% and an average viscosity of 10,000 cps. One-inch wide roll samples of the finished tape were tested for adhesion to steel, 90° tack, and unwind force at various speeds after storage under the conditions described below. The results are shown in the following Table V:

TABLE V

| Panel Adhesin, oz./inch | | |
|---|---|---|
| 12 day shelf | | 31 |
| 12 day 120° F | | 35 |
| 90° Tack, oz./inch | | |
| 11 day shelf | | 28 |
| 12 day 120° F | | 27 |
| Unwind Force, oz./inch | 12 Day Shelf | 12 Days 120° F |
| 1 ft./min. | 18 | 23 |
| 16 ft./min. | 17 | 20 |
| 60 ft./min. | 14 | 18 |
| 160 ft./min. | 13 | 16 |

To check the printability of this tape, the "ink receptivity test" described in Ex. 4 was carried out utilizing the inks from Examples 3 and 5. No ink transfer or adhesive pick-off was observed. Similar good results were also found for a pigmented version of the same commercial packaging tape.

EXAMPLE 7

This example illustrates the versatility of the printable release coat system. The release coat of Ex. 1 was reformulated as follows:

| Resin Components | |
|---|---|
| Acryloid B 99 | 78 |
| Polyketone resin | 20 |
| Release Agent (ODUP0 | 2 |
| | 100 |
| Solvent Components | |
| Toluene | 1,645 |
| MEK | 205 |
| Isopropyl Alcohol | 50 |
| | 1,900 |

A 5% solution of the above ingredients was applied with a No. 4 Mayer Bar on a 1.75 mil Matte acetate film of a commercial pressure-sensitive mending tape. On the opposite side of the above film backing, an acrylic pressure-sensitive adhesive was applied at a dry coating weight of 20 lbs./ream. The adhesive was formulated with the following components:

|  | Parts by Weight |
|---|---|
| Polyethyl acrylate (Aroset 1081 45%) | 167 |
| Poly n butyl acrylate (Aroset 1163 30%) | 83 |
| Ashland Chemical Co. | | and diluted to 25% solids with an aliphatic hydrocarbon solvent system. Prior to application, an isocyanate curing agent was incorporated therein accompanied with stirring for 10 minutes. The viscosity of the catalyzed adhesive was within a range of 800 to 1,600 cps. One-inch wide roll samples of the finished tape were tested according to standard PSTC methods of adhesion to steel, 90° tack, and unwind force at various speeds after storage under conditions described below. The results are shown in the following Table VI:

TABLE VI

| Panel Adhesion, oz./inch | | |
|---|---|---|
| 12 day shelf | 46 | |
| 12 day 120° F | 42 | |
| 90° Tack, oz./inch | | |
| 12 day shelf | 15 | |
| 12 day 120° F | 10 | |
| Unwind Force, oz./inch | 12 Day Shelf | 12 Day 120° F |
| 1 ft./min. | 9 | 12 |
| 16 ft./min. | 10 | 13 |
| 60 ft./min. | 9 | 10 |
| 160 ft./min. | 7 | 8 |

To check the printability of this tape the "ink receptivity test" described in Ex. 4 was carried out utilizing the inks from Examples 3 and 5. No ink transfer or adhesive pick-off was observed.

EXAMPLE 8

The release coat of Example 5 was diluted with toluene to a solids content of only 0.25% and the water clear solution applied with a No. 4 Mayer Bar on a biaxially oriented 1.25 mil polypropylene film. On the opposite side of the same film, an acrylic adhesive similar in composition to the one described in Example 7 was applied. The coating weight was only 15 lbs./ream for a similar adhesive solids content and viscosity range. One-inch wide roll samples of this clear tape were shelf and oven (120° F) aged for 12 days and subsequently tested as described in previous examples. The results are summarized below:

TABLE VII

| Panel Adhesion, oz./inch | |
|---|---|
| 12 day shelf | 32 |
| 12 day shelf | 28 |
| 90° Tack, oz./inch. | |
| 12 day shelf | 24 |
| 12 day shelf | 20 |
| High Speed (160 ft./min.) Unwind Force, oz./inch | |
| 12 day shelf | 5 |
| 12 day shelf | 4 |

The "ink receptivity test" described in Ex. 4 was carried out also for this tape utilizing the inks from Examples 3 and 5. For this tape construction and the very low release coat concentration, the inks from Example 5 showed a somewhat better performance than the ink mentioned in Example 3.

EXAMPLE 9

Although basically no overcoat is necessary due to excellent ink anchorage of the release coat formulations described in the previous examples, certain systems involving highly agressive adhesives or requiring retention of printing sharpness under adverse conditions may require a protective overcoat. A preferred overcoat, which exhibits excellent drying speed and appearance, was formulated from blends of release agents described in U.S. Pat. Nos. 3,475,196 and 2,532,011. These can be applied at concentration levels ranging from 1 to 15%. This overcoat will give a much easier release to very aggressive adhesives and will also definitely prevent any picking-off of adhesives, when this condition might occur.

Although Mylar film has been shown in the examples, any backing material ordinarily used for this purpose may be used. The particular material chosen is dependent upon the end use for the pressure sensitive adhesive tape. The backing should have sufficient mechanical strength, humidity resistance, temperature insensitivity and other qualities, so as to be suitable for the particular purpose for which the tape was designed. Examples of backing material include fibrous and nonfibrous materials which may be made by weaving, compounding, extruding, etc., as for example, the backing material includes: paper, cotton and other cellulosic materials, plastics such as acetates, vinyl halides, polyalkylene and polyester films, polypropylene (both biaxial oriented and monodirectional), glass fabrics, metal foils, and the like.

Various modifications can be made within the scope of the following claims.

I claim:

1. A pressure-sensitive adhesive tape comprising a backing of paper, cloth, film, or foil material, a pressure-sensitive adhesive applied to one side of said backing, and a release coating composition applied to the other side of said backing, the release coating composition being a blend of about 10–30 parts by weight of an organic release agent, about 20–70 parts of a film former, and from 15–40 parts of a polyketone resin to provide printability.

2. The pressure-sensitive tape of claim 1 wherein the film former is a combination of a polypropylene and glycerol terephthalate polyester resin and a vinyl acetate/vinyl alcohol resin.

3. The pressure-sensitive tape of claim 1 wherein an overcoat of release agent is applied to the already established release coating composition on said backing.

4. The pressure-sensitive tape of claim 1 wherein said organic release agent is selected from the group consisting of poly-N-acyl-imines such as octadecyl urea of polyethylemeimine, octadecyl polyvinyl carbamate, Werner chrome complex compounds such as stearato chromic chloride and mixtures of these.

5. The pressure-sensitive tape of claim 2 wherein the polyketone resin has a specific gravity of 1.14, a softening point of 97° C. and weighs 9.5 pound per gallon and is present in the amount of 18 – 20 parts by weight per hundred parts of release coating composition.

* * * * *

UNITED STATES PATENT OFFICE
CERTIFICATE OF CORRECTION

Patent No. 4,070,523    Dated January 24, 1978

Inventor(s) Alfred Blum and Charles Bartell

It is certified that error appears in the above-identified patent and that said Letters Patent are hereby corrected as shown below:

Col. 6, line 51, change "over" to --oven--.

Signed and Sealed this

Twenty-third Day of May 1978

[SEAL]

Attest:

RUTH C. MASON
Attesting Officer

LUTRELLE F. PARKER
Acting Commissioner of Patents and Trademarks